(12) United States Patent
Haas et al.

(10) Patent No.: US 12,283,677 B2
(45) Date of Patent: Apr. 22, 2025

(54) BATTERY HOUSING ASSEMBLY WITH HEAT TRANSFER DEVICE, AND TRACTION BATTERY WITH BATTERY HOUSING ASSEMBLY

(71) Applicant: KAUTEX TEXTRON GmbH & Co. KG, Bonn (DE)

(72) Inventors: Felix Haas, Bonn (DE); Moritz Lipperheide, Bonn (DE); Georg Enkirch, Salz (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 723 days.

(21) Appl. No.: 17/605,905

(22) PCT Filed: Mar. 9, 2020

(86) PCT No.: PCT/EP2020/056170
§ 371 (c)(1),
(2) Date: Oct. 22, 2021

(87) PCT Pub. No.: WO2020/216516
PCT Pub. Date: Oct. 29, 2020

(65) Prior Publication Data
US 2022/0216538 A1 Jul. 7, 2022

(30) Foreign Application Priority Data
Apr. 24, 2019 (DE) .......................... 102019110613.3

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS

2011/0269008 A1* 11/2011 Houchin-Miller .......................... H01M 10/6567
429/120
2012/0261107 A1 10/2012 Prinz et al.
(Continued)

FOREIGN PATENT DOCUMENTS

| CN | 103947004 | 7/2014 |
| DE | 202012101076 | 4/2012 |

(Continued)

OTHER PUBLICATIONS

PCT International Preliminary Report on Patentability for corresponding PCT Application No. PCT/EP2020/056170 dated Jul. 5, 2021, 9 pages.
(Continued)

*Primary Examiner* — Carlos Barcena
(74) *Attorney, Agent, or Firm* — Lee & Hayes, P.C.

(57) ABSTRACT

A battery housing assembly includes a battery housing which encloses an interior for receiving a plurality of battery cells. A heat transfer device which has an inlet, an outlet, and at least one fluid channel arranged fluidically therebetween. The fluid flows through the heat transfer device from the inlet to the outlet via the at least one fluid channel that is arranged in the interior. A contact side of the channel is pressed against at least one contact element to the battery cells in order to transfer heat. At least one expansion element, as a result of the fluid in the heat transfer device being pressurized, expands in order to press the at least one fluid channel against the at least one contact element by bracing against a bracing surface.

12 Claims, 4 Drawing Sheets

Figure 1:
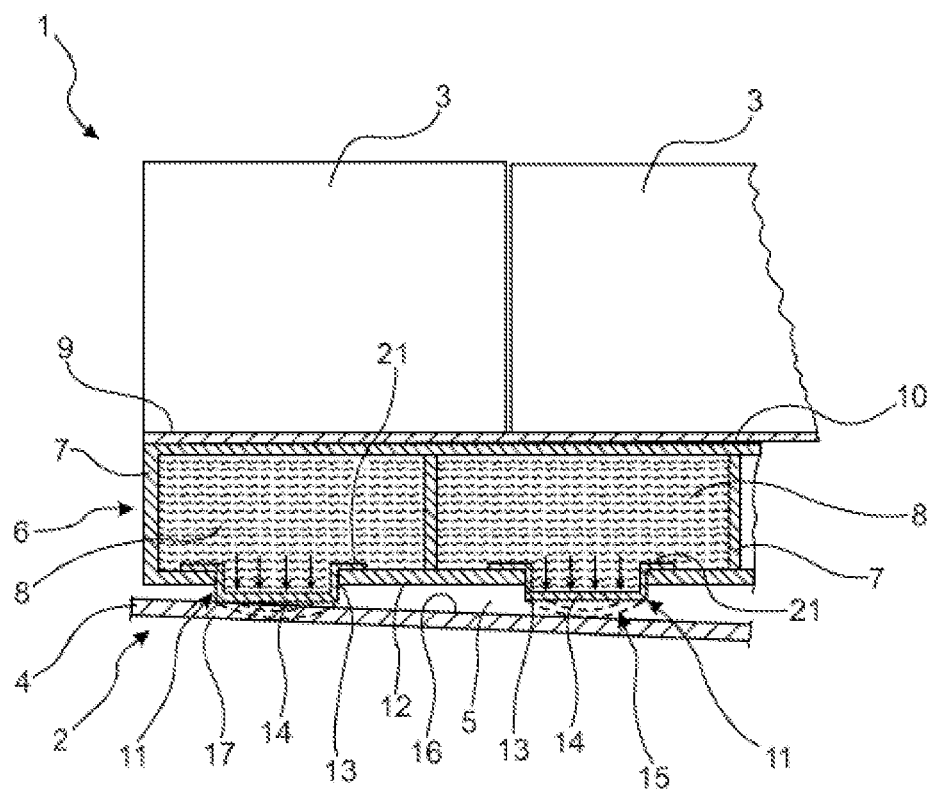

(51) Int. Cl.
*H01M 10/625* (2014.01)
*H01M 10/6567* (2014.01)
*H01M 50/204* (2021.01)

(52) U.S. Cl.
CPC ..... *H01M 10/6567* (2015.04); *H01M 50/204* (2021.01); *H01M 2220/20* (2013.01)

(56) References Cited

U.S. PATENT DOCUMENTS

| | | |
|---|---|---|
| 2012/0298433 A1 | 11/2012 | Ohkura |
| 2013/0244077 A1 | 9/2013 | Palanchon et al. |
| 2015/0270586 A1 | 9/2015 | Wang et al. |

FOREIGN PATENT DOCUMENTS

| | | |
|---|---|---|
| DE | 102011075820 | 11/2012 |
| DE | 102016210530 | 12/2017 |
| DE | 102017001683 | 8/2018 |
| DE | 102017113973 | 12/2018 |
| JP | 2012227148 | 11/2012 |
| JP | 2012248299 | 12/2012 |
| JP | 2018116813 | 7/2018 |
| TW | 555160 | 9/2003 |
| WO | WO2011088997 | 7/2011 |
| WO | WO2013106714 | 7/2013 |
| WO | WO2018206896 | 11/2018 |

OTHER PUBLICATIONS

PCT Search Report and Written Opinion for corresponding PCT Application No. PCT/EP2020/056170 dated Jun. 19, 20201, 17 pages.
Japanese Notice of Reasons for Rejection for corresponding JP Patent Application No. 2021563092 dated Nov. 14, 2022, 9 pages.
Chinese Office Action from corresponding Chinese Patent Application No. 202080031033.6 dated Apr. 26, 2023, 9 pages.
PCT International Preliminary Report on Patentability English translation for corresponding PCT Application No. PCT/EP2020/056170 dated Jul. 5, 2021, 8 pages.

* cited by examiner

BATTERY HOUSING ASSEMBLY WITH HEAT TRANSFER DEVICE, AND TRACTION BATTERY WITH BATTERY HOUSING ASSEMBLY

This Application claims priority to PCT Application No. PCT/EP2020/056170, filed Mar. 9, 2020, which claims priority to German Patent Application No. 10 2019 110 613.3, filed Apr. 24, 2019, the contents of each of which is incorporated herein by reference.

The present invention relates to a battery housing assembly, in particular as a battery housing assembly for a vehicle traction battery which can be temperature-controlled by a fluid, comprising a battery housing which encloses an interior for receiving a plurality of battery cells; and a heat transfer device which has an inlet, an outlet, and at least one fluid channel arranged fluidically therebetween, wherein the fluid can flow through the heat transfer device from the inlet to the outlet via the at least one fluid channel; and wherein the at least one fluid channel is arranged in the interior and a contact side of said channel can be pressed against at least one contact element to the battery cells in order to transfer heat.

The present invention also relates to a traction battery which can be temperature-controlled by a fluid and comprises the aforementioned battery housing assembly; a plurality of battery cells received in the battery housing of the battery housing assembly; and at least one contact element for transferring heat between the at least one fluid channel and the plurality of battery cells.

Battery housing assemblies for traction batteries which can be temperature-controlled by a fluid and corresponding traction batteries which can be temperature-controlled by a fluid are already known in various embodiments from the prior art. They have to meet a number of requirements. For example, the battery housings are intended to encase the battery cells and battery modules received therein in a crash-proof manner and shield them from the environment. Furthermore, the battery housings should allow a traction battery to be manufactured cost-effectively and should be designed to make it simple to service the battery modules received in the battery housing.

Known battery housings for traction batteries are made from welded or pressed sheet steel or cast aluminum, for example. However, plastics and/or composite materials are also increasingly being used for such battery housings, since they are lighter than metals, for example.

Contemporary traction batteries are highly temperature-sensitive. Since a current through traction batteries generates heat, battery cooling elements are usually arranged in the housing, which cooling elements, as heat exchangers, absorb the heat from the battery modules and transport it out of the battery housing. Moreover, when the ambient temperature is low, for example, it is advantageous to heat traction batteries to a suitable operating temperature as quickly as possible. This is true both when charging and when discharging traction batteries.

Fluids, i.e. gases or, preferably, liquids, are typically used to control the temperature of traction batteries. Heat can be transferred from the fluid to the battery cells, or vice versa. Alternatively, a cooling circuit can be provided in which the fluid changes its state of matter in order to absorb heat for evaporation or to give off heat during condensation. This allows particularly efficient temperature control of the traction battery.

In order to ensure sufficient heat transfer, the contact between the fluid channel and the contact element can be improved by an additional pressing force. Resilient spring elements are known for this purpose from the prior art. However, these are complex to manufacture and generate a permanent mechanical load. This mechanical load can be problematic, in particular for battery housings with low rigidity.

The problem addressed by the present invention is therefore that of providing a battery housing assembly and a traction battery which can be temperature-controlled by a fluid and comprises such a battery housing assembly, which assembly and battery overcome at least some of the aforementioned disadvantages and which are in particular easy to manufacture and have high reliability and durability.

The problem addressed by the present invention is solved by a battery housing assembly having the features of claim 1. Advantageous embodiments of the battery housing assembly are described in the claims dependent on claim 1.

More specifically, the problem addressed by the present invention is solved by a battery housing assembly, in particular as a battery housing assembly for a vehicle traction battery which can be temperature-controlled by a fluid, comprising a battery housing which encloses an interior for receiving a plurality of battery cells; and a heat transfer device which has an inlet, an outlet, and at least one fluid channel arranged fluidically therebetween, wherein the fluid can flow through the heat transfer device from the inlet to the outlet via the at least one fluid channel; and wherein the at least one fluid channel is arranged in the interior and the contact side of said channel can be pressed against at least one contact element to the battery cells in order to transfer heat.

The battery housing assembly according to the invention is characterized in that at least one expansion element is provided, which element, as a result of the fluid in the heat transfer device being pressurized, expands in order to press the at least one fluid channel against the at least one contact element by bracing against a bracing surface.

The available fluid pressure in the heat transfer device is therefore used to generate a pressing force of the at least one fluid channel on the contact element. Surface-to-surface heat transfer can be ensured in this way. The use of mechanical spring elements for generating contact pressure can be dispensed with. In the case of the battery housing assembly according to the invention, a mechanical load is reduced by the at least one fluid channel only being pressed against the contact element during use, i.e. when the fluid is pressurized. The fluid channel is therefore not subjected to a mechanical load when not in use. The same is true for a bracing surface against which the expansion element braces and components mechanically connected thereto. Therefore, in contrast to the use of resilient spring elements, the mechanical load acts only temporarily. This is particularly advantageous when using plastics components since these tend to creep and permanently deform when subjected to a permanent mechanical load. Improved pressing of the at least one fluid channel against the contact element can also reduce the thickness of this contact element and thus the thermal resistance between the at least one fluid channel and the battery cells.

Another advantage of the battery housing assembly according to the invention is the compensation for component tolerances and component deformation during operation, the latter occurring automatically under load, i.e. when the fluid is supplied. The traction battery can thus be charged and discharged reliably. At the same time, the heat transfer device has a high degree of reusability, since the adaptation concerning the pressing of the at least one fluid channel is not required in principle.

Furthermore, pressing the at least one fluid channel against the at least one contact element can bring about a force transmission, which moreover ensures that the battery cells are also in thermal contact with the contact element. The battery cells are typically in thermal contact with the contact element from a side opposite the at least one fluid channel.

The vehicle can be any vehicle with an electric drive, for example a purely electrically operated vehicle or a so-called hybrid vehicle with an electric drive and an additional drive, e.g. an internal combustion engine. The number and arrangement of electric drive motors in the vehicle is irrelevant to the present invention.

The battery housing can be designed in two parts, with a base part and a cover, for example, so that the battery housing can be closed after the battery cells have been inserted. The battery housing can also be opened to allow access to the battery cells. The battery housing can be made of metal, for example. Preferably, however, the battery housing is made of a plastics material or a composite material so that it has a low weight. Since the mechanical load caused by the pressing of the at least one fluid channel is only temporary, tolerance requirements for the battery housing can be reduced. It is also possible to reduce the rigidity requirements for the battery housing, allowing weight to be saved. This can also reduce the risk of sagging.

The heat transfer device comprises an inlet and an outlet through which the fluid circulates. The inlet and outlet can lead out of the battery housing or, alternatively, can be located in the battery housing, for example in order to distribute the fluid in the battery housing, in particular when the battery cells are arranged in a plurality of layers. The at least one fluid channel acts as a heat exchanger in order to absorb heat from the contact element and/or to give off heat to said element, depending on an operation of the heat transfer device. As a result, the temperature of the battery cells can be controlled in order to allow optimal operation and to make their maximum storage capacity available.

The fluid can be a gas or, preferably, a liquid. Heat can then be transferred from the fluid via the at least one fluid channel and the at least one contact element to the battery cells, or vice versa. Alternatively, a cooling circuit can be provided in which the fluid changes its state of matter in order to absorb heat for evaporation or to give off heat during condensation. This allows particularly efficient temperature control of the battery cells.

The at least one fluid channel is arranged in the interior for transferring heat to the at least one contact element or for absorbing heat from the at least one contact element. The at least one contact element is in turn in thermal contact with the battery cells for further heat transfer. The at least one contact element is typically made of a metal with high thermal conductivity, preferably aluminum. The at least one fluid channel is tubular and has a contact side that makes contact with the contact element in order to establish good thermal contact therewith. The contact side is preferably a planar wall of the at least one fluid channel. The at least one fluid channel particularly preferably has a rectangular cross section. The walls of the at least one fluid channel are dimensionally stable. The at least one fluid channel is also typically made of a metal with high thermal conductivity, preferably aluminum. A plurality of fluid channels can in principle be connected in parallel and/or in rows in any desired manner. A fluid channel or a plurality of fluid channels can be designed or arranged in an overall meandering shape.

The at least one expansion element is resiliently deformable in order to allow expansion. For example, the at least one expansion element can be made from a plastics material or a rubber material. The at least one expansion element is expanded by the pressure of the fluid during operation of the heat transfer device, as a result of which the at least one fluid channel is pressed against the at least one contact element. The at least one expansion element is then braced against the bracing surface, which is sufficiently stable. A desired mechanical pressure with which the at least one fluid channel is pressed against the at least one contact element can be set via the number of expansion elements, and the arrangement, shape, and/or size thereof.

In an advantageous embodiment, the at least one expansion element is arranged on a bracing side of the at least one fluid channel opposite the contact side in order to press the at least one fluid channel against the at least one contact element by bracing against the bracing surface. As a result, the whole of the at least one fluid channel is pressed against the at least one contact element by the bracing surface. A change in the cross section of the at least one fluid channel is prevented, and therefore the flow of the fluid through the at least one fluid channel is not impaired.

In an advantageous embodiment, the at least one fluid channel has at least one recess in the channel wall thereof, and the at least one expansion element is arranged in the recess in the channel wall and designed to expand when the at least one fluid channel is pressurized. The at least one expansion element can be inserted into the recess, for example. The at least one expansion element preferably engages the channel wall both internally and externally here. Alternatively, the at least one expansion element can be arranged internally or externally on the at least one fluid channel in the region of the relevant recess. In this case, a plurality of expansion elements can be formed by a single resilient element, for example by a rubber sheet which is arranged internally in the at least one fluid channel and covers a plurality of recesses. The at least one expansion element can extend through the recesses even before the fluid is pressurized, or only after the fluid is pressurized. An increase in pressure in the at least one fluid channel directly causes the at least one expansion element to bulge outward.

In an advantageous embodiment, the at least one fluid channel has a plurality of recesses in the channel wall thereof, in each of which recesses an expansion element is arranged, the plurality of recesses preferably being arranged in at least one row together with the expansion elements. When there is a plurality of recesses and expansion elements, the at least one fluid channel can be pressed evenly against the at least one contact element. Furthermore, adaptation to different embodiments of the bracing surface or a deformation of the bracing surface can be implemented. A large number of expansion elements typically allows very precise adaptation to the bracing surface, even if the bracing surface undergoes deformation during operation. Depending on the shape of the at least one fluid channel and the recesses, it may be preferable for the at least one fluid channel to have a plurality of rows of recesses in order to achieve an even pressing.

In an advantageous embodiment, each of the plurality of recesses is circular or rectangular. It is simple to make such recesses in the at least one fluid channel. It is also simple to produce correspondingly shaped expansion elements.

In an advantageous embodiment, the at least one expansion element is positioned between the at least one fluid channel and the bracing surface; and the at least one expansion element is in fluid connection with the inlet, the outlet, and/or the at least one fluid channel. The at least one expansion element is thus positioned outside the at least one fluid channel, specifically between the at least one fluid channel and the bracing surface. As a result, the whole of the at least one fluid channel is pressed against the at least one contact element. A change in the cross section of the at least one fluid channel is prevented. The at least one expansion element can be designed in the manner of a balloon or a pillow, for example. The at least one expansion element can in principle be connected to the heat transfer device at any point. A plurality of expansion elements can be connected to the heat transfer device either jointly or individually.

In an advantageous embodiment, the at least one expansion element is arranged in a bypass line parallel to the at least one fluid channel. The bypass line preferably has a smaller cross-sectional area than the at least one fluid channel. A plurality of expansion elements is preferably arranged along the bypass line. Alternatively, the bypass line can generally be designed as an expansion element, for example as a resiliently deformable tube.

In an advantageous embodiment, the bracing surface is an inner surface of a housing wall of the battery housing, preferably an inner surface of a base wall of the battery housing. A separate component to provide the bracing surface is therefore not required.

When braced against the inner surface of the base wall, deformations of the housing due to the temporary mechanical loads can be reduced. At the same time, the expansion elements effect a reliable adaptation to the inner surface of the base wall, so that the at least one fluid channel can be reliably pressed against the at least one contact element. When the inner surface of the base wall is used as the bracing surface, the gravitational force of the battery cells generates a counterforce, as a result of which the thermal contact between the at least one contact element and the at least one fluid channel can be implemented particularly reliably.

In an advantageous embodiment, a plurality of contact elements is provided for heat transfer with the battery cells, preferably one contact element for each battery cell; and the contact side of the at least one fluid channel can be pressed against the plurality of contact elements. In this way, particularly reliable contacting of the contact elements can be achieved via the at least one fluid channel because the pressing of the at least one fluid channel can be adapted locally in each case. Preferably, a plurality of fluid channels can be pressed individually against the plurality of contact elements; particularly preferably, each fluid channel can be pressed individually against one contact element.

In an advantageous embodiment, the heat transfer device has a plurality of fluid channels, the contact sides of which can be pressed against the at least one contact element. In this way, particularly reliable contacting of the contact elements can be achieved via the at least one fluid channel because the pressing of each fluid channel can be adapted locally. The fluid channels can be fixedly mechanically coupled to one another. Alternatively, the individual fluid channels can be arranged so as be movable relative to one another. Preferably, the plurality of fluid channels can be pressed individually against a plurality of contact elements; particularly preferably, each fluid channel can be pressed individually against one contact element.

In an advantageous embodiment, a bracing plate is arranged in the battery housing and the bracing surface is a surface of the bracing plate, the bracing plate preferably forming an intermediate wall or a central wall of the battery housing. In principle, it is therefore not necessary for a housing wall of the battery housing to provide the bracing surface. This preferably allows the battery cells to be arranged in a plurality of layers, so that each of the fluid channels can be pressed against the respective contact elements independently of the arrangement of the battery cells and the contact elements. The bracing plate also provides structural reinforcement for the battery housing in this case.

More preferably, the plurality of battery cells is arranged in at least two layers in the interior; a heat transfer device is assigned to each layer; and the contact side of each fluid channel can be pressed against a contact element to the battery cells of a layer in order to transfer heat. The battery cells are accordingly arranged in a plurality of layers in the interior. This ensures that the temperature of the battery cells in each layer can be reliably controlled because they are each in thermal contact with the at least one fluid channel assigned to the layer. Arranging the battery cells in a plurality of layers opens up a high degree of design freedom for the traction battery. Preferably, two adjacent layers are designed in such a way that, on both sides of a bracing element, for example a bracing plate, there is firstly a heat transfer device, which adjoins a contact element in each case. The battery cells of the corresponding layer in turn adjoin said contact element.

The problem addressed by the present invention is also solved by means of a traction battery which can be temperature-controlled by a fluid and comprises the aforementioned battery housing assembly; a plurality of battery cells received in the battery housing of the battery housing assembly; and at least one contact element for transferring heat between the at least one fluid channel and the plurality of battery cells.

The above statements with regard to advantages and embodiments of the battery housing assembly also apply, mutatis mutandis, to the traction battery that can be temperature-controlled by a fluid and comprises said battery housing assembly.

Figure 2:
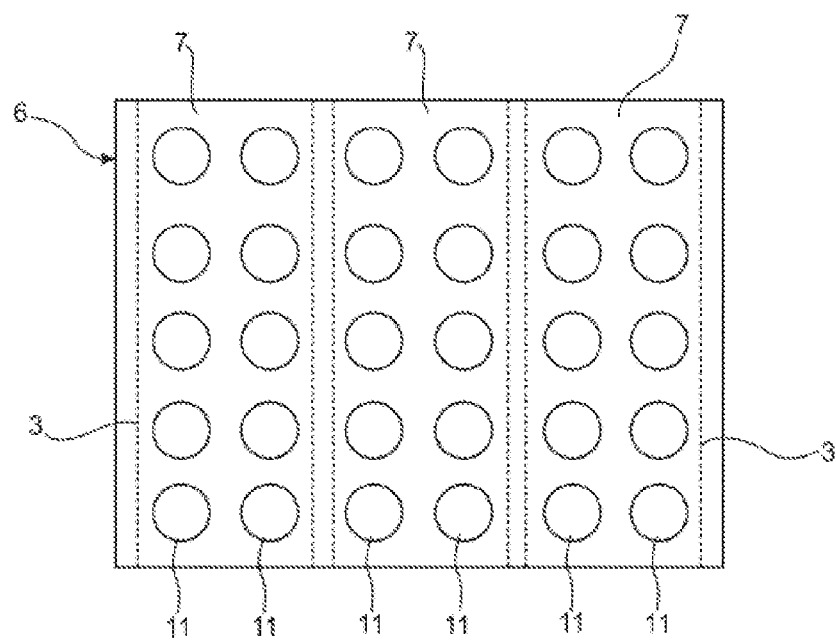
Figure 3:
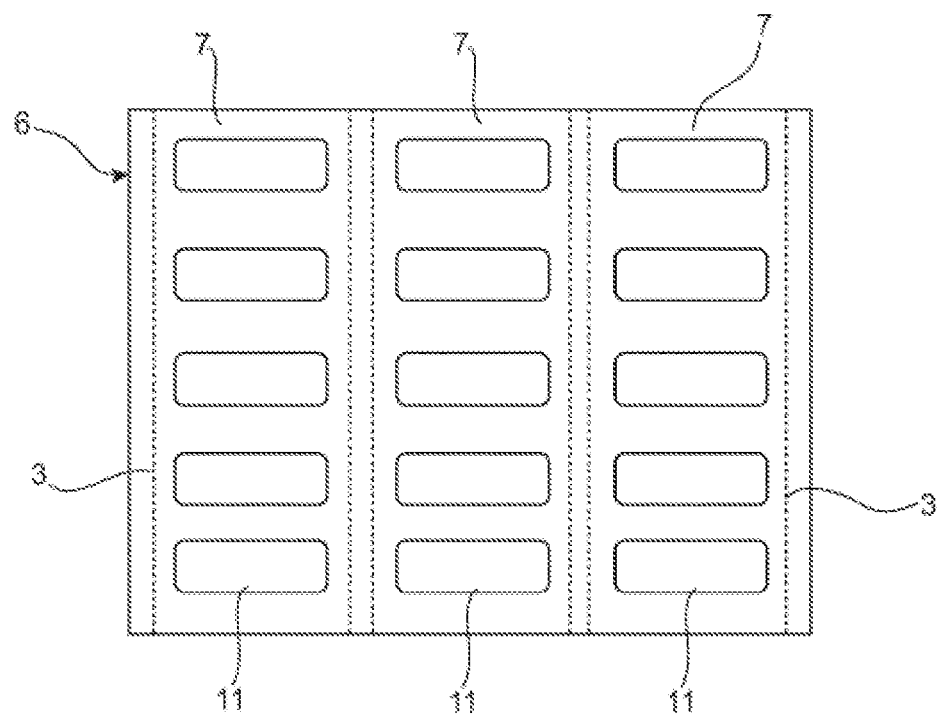
Figure 4:
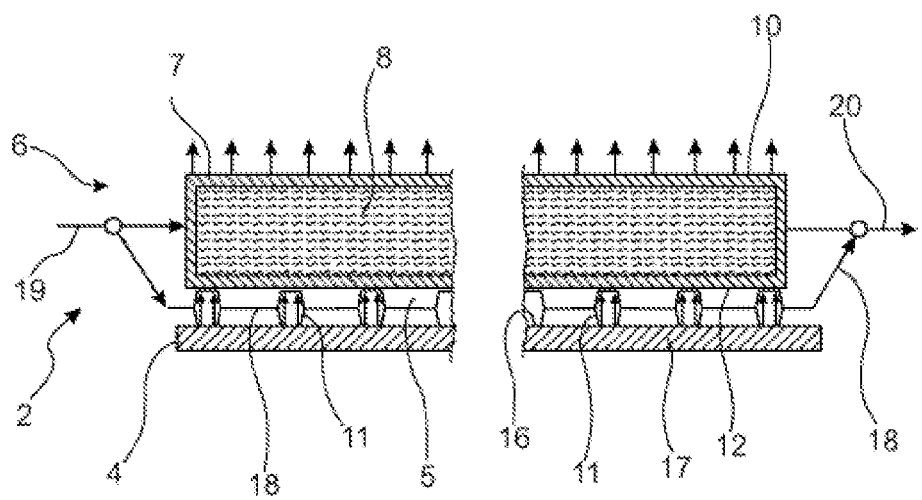

Further advantages, details, and features of the invention can be found in the embodiments explained below. The drawings show, in detail, the following:

FIG. 1: a partial lateral section of a traction battery according to the invention according to a first, preferred embodiment of the present invention, comprising a battery housing assembly and a plurality of battery cells, the battery housing assembly having a heat transfer device with a plurality of fluid channels;

FIG. 2: a schematic view of the plurality of fluid channels of the traction battery from the first embodiment, the fluid channels being arranged adjacently and each having a plurality of circular expansion elements;

FIG. 3: a schematic view of a plurality of fluid channels according to a second embodiment of the present invention, the fluid channels being arranged adjacently and each having a plurality of rectangular expansion elements; and FIG. 4: a partial lateral section of a traction battery according to the invention according to a third embodiment of the present invention, comprising a battery housing assembly and a plurality of battery cells, the battery housing assembly having a heat transfer device with a plurality of fluid channels.

In the following description, the same reference signs denote the same components or features; in the interest of avoiding repetition, a description of a component made with reference to one figure also applies to the other figures. Furthermore, individual features which have been described in connection with one embodiment can also be used separately in other embodiments.

FIG. 1 shows a vehicle traction battery 1 that can be temperature-controlled by a fluid according to a first, preferred embodiment of the present invention. The vehicle can be any vehicle with an electric drive, for example a purely electrically operated vehicle or a so-called hybrid vehicle with an electric drive and an additional drive, e.g. an internal combustion engine. The vehicle can have any arrangement of electric motors.

The traction battery 1 comprises a battery housing assembly 2 and a plurality of battery cells 3. The battery housing assembly 2 comprises a battery housing 4 which encloses an interior 5 for receiving the battery cells 3. The battery housing 4 from the first embodiment is made of a plastics material or a composite material with a low weight.

The battery housing assembly 2 further comprises a heat transfer device 6, which has an inlet, an outlet, and a plurality of fluid channels 7 fluidically arranged therebetween. The fluid channels 7 are tubular with a rectangular cross section. The walls of the fluid channels 7 are made to be dimensionally stable from a metal with high thermal conductivity, preferably aluminum. The fluid channels 7 are in principle connected in parallel and/or in rows in any desired manner. The fluid channels 7 are arranged in the interior 5. The fluid channels 7 can be fixedly mechanically coupled to one another. Alternatively, the individual fluid channels 7 can be arranged so as be movable relative to one another.

A fluid 8 flows through the heat transfer device 6 from the inlet to the outlet via the fluid channels. In this embodiment, the fluid 8 is a gas or, preferably, a liquid. The fluid channels 7 are arranged in the interior 5. The inlet and outlet can lead out of the battery housing 4 or, alternatively, can be located in the battery housing 4, for example in order to distribute the fluid 8 in the battery housing 4.

The traction battery 1 also comprises a contact element 9, the underside (based on FIG. 1) of which is in thermal contact with a contact side 10 of the fluid channels 7 in order to allow heat transfer between the contact element 9 and the fluid channels 7. In this embodiment, the contact element 9 is made of a metal with high thermal conductivity, preferably aluminum. The contact sides 10 of the fluid channels 7 contact the contact element 9 in order to establish good thermal contact therewith. The contact side 10 is a planar wall of the relevant fluid channel 7. Moreover, the contact element 9 is in thermal contact with the battery cells 3 in order to transfer heat.

The fluid channels 7 together form a heat exchanger in order to absorb heat from the contact element 9 and/or to give off heat to said element, depending on an operation of the heat transfer device 6. As a result, the temperature of the battery cells 3 can be controlled in order to allow optimal operation and to make their maximum storage capacity available. The heat is accordingly transferred from the fluid 8 via the fluid channels 7 and the contact element 9 to the battery cells 3, or vice versa. The contact element 9 thus serves to transfer heat between the fluid channels 7 and the battery cells 3.

As can be seen from FIG. 1, a plurality of expansion elements 11 are formed in the fluid channels 7. The expansion elements 11 are resiliently deformable in order to allow expansion. The expansion elements 11 can be made of a resilient plastics material or a resilient rubber material, for example. For this purpose, two rows having recesses 13, in each of which recesses an expansion element 11 is arranged, are arranged in the fluid channels 7 on a bracing side 12 of the fluid channels 7 opposite the contact side 10. The recesses 13 and the expansion elements 11 are each circular, as can be seen from FIG. 2.

The expansion elements 11 are inserted into the recesses 13 from an inside of the fluid channels 7 in this case. The expansion elements 11 internally abut the fluid channels 7 by means of a flange region 21 and extend through the recesses 13 even when the fluid 8 is not pressurized.

An increase in pressure in the fluid channels 7, i.e. the pressurization of the fluid 8, causes the expansion elements 11 to expand, as shown in FIG. 1. A free wall 14, which does not abut the relevant fluid channel 7, is domed outward by the pressure, as is shown in FIG. 1 for the expansion element 11 on the right-hand side.

In this embodiment, the expansion of the expansion elements 11 results in the formation of a bulge 15. As a result of the pressurization of the fluid 8 in the heat transfer device 6, the expansion elements 11 expand, thus forming the bulges 15. In this embodiment, as a result of the pressurization of the fluid 8, the bulges 15 expand as far as an inner surface 16 of a base wall 17 of the battery housing 4 so that the bulges 15 and thus the fluid channels 7 and the heat transfer device 6 are braced against the inner surface 16 together. The inner surface 16 of the base wall 17 thus forms a bracing surface 16 for the fluid channels 7.

As a result of the fluid channels 7 being braced against the bracing surface 16, said fluid channels are pressed against the contact element 9 by the expansion elements 11 when the fluid 8 is pressurized. This improves the thermal contact between the contact element 9 and the fluid channels 7 as well as between the contact element 9 and the battery cells 3. A change, in particular a reduction, in the cross section of the fluid channels 7 is prevented by their dimensionally stable design, and therefore a circulation of the fluid 8 through the fluid channels 7 is not impaired.

The expansion elements 11 are thus only expanded when the fluid 8 is pressurized, so that the fluid channels 7 are pressed against the contact element 9 with a pressing force generated by the fluid pressure. The mechanical loads on the base wall 17 are correspondingly reduced, as a result of which deformations of the battery housing 4, in particular of the base wall 17, are reduced. At the same time, the expansion elements 11 effect a reliable adaptation to the inner surface 16 of the base wall 17, so that the fluid channels 7 can be reliably pressed against the contact element 9. Moreover, the gravitational force of the battery cells 3 generates a counterforce, as a result of which the thermal contact between the contact element 9 and the fluid channels 7 can be implemented particularly reliably.

A large number of expansion elements 11 typically allows very precise adaptation to the bracing surface 16, even if the bracing surface undergoes deformation, for example during operation. Depending on the shape of the fluid channels 7 and the recesses 13, an even pressing of the fluid channels 7 against the contact element 9 can be achieved. A desired mechanical pressure with which the fluid channels 7 are pressed against the contact element 9 can be set via the number of expansion elements 11, and the arrangement, shape, and/or size thereof. Moreover, due to the expansion of the expansion elements 11, component tolerances and component deformation can be automatically compensated for during operation under load, i.e. when the fluid 8 is pressurized.

FIG. 3 concerns a traction battery 1 and a battery housing assembly 2 according to a second embodiment. The traction battery 1 and the battery housing assembly 2 from the second embodiment correspond substantially to the traction battery 1 and the battery housing assembly 2 from the first embodiment, and therefore only the differences between the traction battery 1 and the battery housing assembly 2 from the first and second embodiments are described below. Further details of the traction battery 1 and the battery housing assembly 2 from the second embodiment correspond to those of the traction battery 1 and the battery housing assembly 2 from the first embodiment.

The traction battery 1 and the battery housing assembly 2 from the second embodiment differ from the traction battery 1 and the battery housing assembly 2 from the first embodiment on account of the arrangement and configuration of the recesses 13 and expansion elements 11. In the second embodiment, the fluid channels 7 have only one row with recesses 13, in each of which recesses an expansion element 11 is arranged. In contrast to the first embodiment, the recesses 13 and the expansion elements 11 are each rectangular.

FIG. 4 concerns a traction battery 1 and a battery housing assembly 2 according to a third embodiment. The traction battery 1 and the battery housing assembly 2 from the third embodiment correspond largely to the traction battery 1 and the battery housing assembly 2 from the first or second embodiments, and therefore only the differences between the traction battery 1 and the battery housing assembly 2 from the first and third embodiments are described below. Further details of the traction battery 1 and the battery housing assembly 2 from the third embodiment correspond to those of the traction battery 1 and the battery housing assembly 2 from the first or second embodiment.

The traction battery 1 and the battery housing assembly 2 from the third embodiment comprise a plurality of fluid channels 7 which, however, do not have any recesses 13. In contrast to the first embodiment, a plurality of expansion elements 11 are positioned between the fluid channels 7 and the bracing surface 16 in the second embodiment. The expansion elements 11 are designed in the manner of a balloon or pillow, interconnected via a bypass line 18, and arranged parallel to the fluid channels 7. The expansion elements 11 are in fluid connection with an inlet 19 and an outlet 20 of the heat transfer device 6 via the bypass line 18. The bypass line 18 has a smaller cross-sectional area than the fluid channels 7.

In an alternative embodiment, which can be combined with each of the first to third embodiments, a plurality of contact elements 9 are provided for heat transfer with the battery cells 3, preferably one contact element 9 for each battery cell 3. The contact side 10 of the fluid channels 7 can be pressed against the plurality of contact elements 9. Each fluid channel 7 can particularly preferably be pressed against one of the contact elements 9.

LIST OF REFERENCE SIGNS 1 traction battery
2 battery housing assembly
3 battery cell
4 battery housing
5 interior
6 heat transfer device
7 fluid channel
8 fluid
9 contact element
10 contact side
11 expansion element
12 bracing side
13 recess
14 free wall
15 bulge
16 bracing surface, inner surface
17 base wall
18 bypass line
19 inlet
20 outlet
21 flange region

The invention claimed is:

1. A battery housing assembly which is temperature-controlled by a fluid, the battery housing assembly comprising:
   a battery housing which encloses an interior for receiving a plurality of battery cells; and
   a heat transfer device which has an inlet, an outlet, and at least one fluid channel arranged fluidically therebetween, wherein the fluid flows through the heat transfer device from the inlet to the outlet via the at least one fluid channel,
   wherein:
      the at least one fluid channel is arranged in the interior and a contact side of the at least one fluid channel is pressable against at least one contact element to the plurality of battery cells in order to transfer heat, and
      a plurality of expansion elements are arranged on a bracing side of the at least one fluid channel that is opposite the contact side, whereby, as a result of the fluid in the heat transfer device being pressurized, the plurality of expansion elements expand in order to press the at least one fluid channel against the at least one contact element by bracing against a bracing surface.

2. The battery housing assembly according to claim 1, wherein:
   the at least one fluid channel has at least one recess in a wall of the at least one fluid channel, and
   the plurality of expansion elements are arranged in the at least one recess in the wall and expand as a result of pressurization in the at least one fluid channel.

3. The battery housing assembly according to claim 2, wherein:
   the at least one recess includes a plurality of recesses in the at least one fluid channel,
   in each recess of the plurality of recesses, an expansion element of the plurality of expansion elements is arranged, and
   wherein the plurality of recesses is arranged in at least one row with the plurality of expansion elements.

4. The battery housing assembly according to claim 3, wherein each of the plurality of recesses is circular or rectangular.

5. The battery housing assembly according to claim 1, wherein:
   the plurality of expansion elements are positioned between the at least one fluid channel and the bracing surface; and
   the plurality of expansion elements are in fluid connection with the inlet, the outlet, and/or the at least one fluid channel.

6. The battery housing assembly according to claim 5, wherein the plurality of expansion elements are arranged in a bypass line parallel to the at least one fluid channel.

7. The battery housing assembly according to claim 1, wherein the bracing surface is an inner surface of a base wall of the battery housing.

8. The battery housing assembly according to claim 1, wherein:
the at least one contact element includes a plurality of contact elements,
the plurality of contact elements facilitates heat transfer with the plurality of battery cells, respectively so as to have one contact element for each battery cell, and
the contact side of the at least one fluid channel is pressable against the plurality of contact elements.

9. The battery housing assembly according to claim 1, wherein the at least one fluid channel includes a plurality of fluid channels, respective contact sides of which are pressable against the at least one contact element.

10. The battery housing assembly according to claim 1, wherein a bracing plate is arranged in the battery housing and the bracing surface is a surface of the bracing plate, and
wherein the bracing plate forms an intermediate wall or a central wall of the battery housing.

11. The battery housing assembly according to claim 1, wherein:
the heat transfer device is a first heat transfer device,
the battery housing assembly further comprises a second heat transfer device,
the plurality of battery cells is arranged in at least two layers in the interior,
the first heat transfer device is assigned to a first layer of the at least two layers,
the second heat transfer device is assigned to a second layer of the at least two layers, and
the respective contact side of each fluid channel of the first heat transfer device and the second heat transfer device is pressable against the respective at least one contact element to the plurality of battery cells to transfer heat.

12. A traction battery which is temperature-controlled by a fluid, the traction battery comprising:
a plurality of battery cells;
at least one contact element; and
a battery housing assembly including:
a battery housing which encloses an interior for receiving the plurality of battery cells, and
a heat transfer device which has an inlet, an outlet, and at least one fluid channel arranged fluidically therebetween,
wherein the fluid flows through the heat transfer device from the inlet to the outlet via the at least one fluid channel to transfer heat between the at least one fluid channel and the plurality of battery cells,
wherein the at least one fluid channel is arranged in the interior and a contact side of the at least one fluid channel is pressable against the at least one contact element to the plurality of battery cells in order to transfer heat, and
wherein a plurality of expansion elements are arranged on a bracing side of the at least one fluid channel that is opposite the contact side, whereby, as a result of the fluid in the heat transfer device being pressurized, the plurality of expansion elements expand in order to press the at least one fluid channel against the at least one contact element by bracing against a bracing surface.

* * * * *